United States Patent
Kuehner et al.

(10) Patent No.: US 12,037,008 B2
(45) Date of Patent: Jul. 16, 2024

(54) SYSTEMS AND METHODS FOR COMMUNICATING A BLENDING PARAMETER

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US); Guillermo Pita Gil, Redwood City, CA (US)

(73) Assignees: Toyota Research Institute, Inc., Los Altos, CA (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 273 days.

(21) Appl. No.: 17/715,566

(22) Filed: Apr. 7, 2022

(65) Prior Publication Data
US 2023/0322254 A1    Oct. 12, 2023

(51) Int. Cl.
*B60W 50/16*    (2020.01)
*B60W 10/20*    (2006.01)
(Continued)

(52) U.S. Cl.
CPC ............ *B60W 50/16* (2013.01); *B60W 10/20* (2013.01); *B60W 10/30* (2013.01);
(Continued)

(58) Field of Classification Search
CPC ...... B60W 50/16; B60W 10/20; B60W 10/30; B60W 30/0953; B60W 2510/20;
(Continued)

(56) References Cited

U.S. PATENT DOCUMENTS

| | | |
|---|---|---|
| 4,908,619 A | 3/1990 | Bala et al. |
| 6,219,604 B1 | 4/2001 | Digler et al. |
| | (Continued) | |

FOREIGN PATENT DOCUMENTS

| | | |
|---|---|---|
| KR | 20000033374 A | 6/2000 |
| KR | 101976866 A | 5/2019 |

OTHER PUBLICATIONS

Yusoff, Sabariah M., "Clustering Classification and Human Perception of Automotive Steering Wheel Transient Vibrations", PhD Dissertation, Brunel University London, Jun. 2017, in 232 pages.
(Continued)

*Primary Examiner* — Xiao En Mo
(74) *Attorney, Agent, or Firm* — Christopher G. Darrow; Darrow Mustafa PC

(57) ABSTRACT

System, methods, and other embodiments described herein relate to communicating a blending parameter. In one embodiment, a method includes obtaining a blending parameter that is indicative of a degree to which control of a vehicle is shared between an operator of the vehicle and an advanced driver-assistance system (ADAS) of the vehicle. The method further includes determining a feedback parameter based upon the blending parameter and a psychophysical model, wherein the psychophysical model optimizes a relationship between the blending parameter and the feedback parameter such that sensory feedback based upon the feedback parameter is perceived to be proportional to the blending parameter. The method further includes causing a feedback modality of a steering apparatus of the vehicle to provide the sensory feedback based upon the feedback parameter.

20 Claims, 8 Drawing Sheets

(51) Int. Cl.
 *B60W 10/30* (2006.01)
 *B60W 30/095* (2012.01)

(52) U.S. Cl.
 CPC ..... *B60W 30/0953* (2013.01); *B60W 2510/20* (2013.01); *B60W 2540/221* (2020.02); *B60W 2555/20* (2020.02)

(58) Field of Classification Search
 CPC ....... B60W 2540/221; B60W 2555/20; B60W 2050/146; B60W 50/14; B60W 2050/0008; B60W 30/09; B60W 60/001; B60W 2050/0029; B60W 2540/18; B62D 15/0265
 See application file for complete search history.

(56) References Cited

U.S. PATENT DOCUMENTS

| | | |
|---|---|---|
| 7,639,148 B2 | 12/2009 | Victor |
| 7,946,271 B2 | 5/2011 | Gregorio |
| 8,040,223 B2 | 10/2011 | Mortimer et al. |
| 9,045,074 B2 | 6/2015 | Piasecki et al. |
| 9,079,602 B2 | 6/2015 | Konomi et al. |
| 9,370,064 B2 | 6/2016 | Fensore |
| 10,124,800 B2 | 11/2018 | Jones et al. |
| 10,533,780 B2 | 1/2020 | Yi et al. |
| 10,586,454 B2 | 3/2020 | Toyoda et al. |
| 10,780,915 B2 | 9/2020 | Rakouth et al. |
| 11,011,075 B1 | 5/2021 | Israr et al. |
| 11,554,716 B1 * | 1/2023 | Yasuda ............ B60Q 3/80 |
| 2008/0012697 A1 | 1/2008 | Smith et al. |
| 2009/0093930 A1 | 4/2009 | Hatano et al. |
| 2021/0039715 A1 | 2/2021 | Ferrer et al. |
| 2021/0183215 A1 | 6/2021 | Carter et al. |

OTHER PUBLICATIONS

Erlien, Stephen M., "Shared Steering Control Using Safe Enveloped for Obstacle Avoidance and Vehicle Stability", IEEE Transactions on Intelligent Transportation Systems, Academia, 2015, in 12 pages.
Wikipedia, "Thermoelectric Cooling", Retrieved from https://en.wikipedia.org/wiki/Thermoelectric_cooling, Accessed on Apr. 6, 2022, in 9 pages.
Di Campli Sam Vito, P. et al., "Haptic Navigation Cues on the Steering Wheel", University of Gasgow, Mar. 1, 2019, in 12 pages.
Wilson, G. et al., "Some Like it Hot? Thermal Feedback for Mobile Devices", University of Glasgow, May 7-11, 2011, in 10 pages.
Kening Zhu, et al. "A Sense of Ice and Fire: Exploring Thermal Feedback with Multiple Thermoelectric-cooling Elements on a Smart Ring", International Journal of Human-Computer Studies, Jul. 9, 2019, in 46 pages.
Colorcet, "Collection of Perceptually Accurate Colormaps", Retrieved from https://colorcet.holoviz.org/, Accessed on Apr. 6, 2022, in 5 pages.
Wikipedia, "CIELAB Color Space", Retrieved from https://en.wikipedia.org/wiki/CIELAB_color_space, Accessed on Apr. 6, 2022, in 12 pages.
Wikipedia, "Weber-Fechner Law", Retrieved from https://en.wikipedia.org/wiki/Weber%E2%80%93Fechner_law#Fechner's_law, Accessed on Apr. 6, 2022, in 9 pages.

* cited by examiner

SYSTEMS AND METHODS FOR COMMUNICATING A BLENDING PARAMETER

TECHNICAL FIELD

The subject matter described herein relates, in general, to communicating a blending parameter, and, more particularly, to utilizing a psychophysical model to determine a feedback parameter that communicates the blending parameter.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems of the vehicle such as an advanced driver-assistance system (ADAS) can assist an operator of the vehicle in operating the vehicle.

An ADAS may be equipped with traded control functionality or shared control functionality. In traded control functionality, a task is either performed entirely by the ADAS or entirely by the operator of the vehicle. In shared control functionality, the responsibility for the task is shared by the operator and the ADAS. Some conventional ADASs tend to be deficient with respect to communicating a degree to which control is being shared in shared control functionality. Furthermore, some conventional ADASs tend not to account for factors that influence human perception when communicating information to the operator of the vehicle.

SUMMARY

An example blending parameter notification system for communicating a blending parameter of a vehicle is disclosed herein. In one embodiment, the blending parameter notification system obtains a blending parameter from an ADAS of a vehicle, where the blending parameter is indicative of a degree to which control of the vehicle is shared between an operator of the vehicle and the ADAS. In an example, a value of the blending parameter ranges from zero (full operator control of the vehicle) to one (full ADAS control of the vehicle). The blending parameter notification system determines a feedback parameter based upon the blending parameter and a psychophysical model. Human perception of a physical quantity tends to be non-linear with respect to the physical quantity perceived. For example, a one-degree temperature change of a material being touched by a human may not be perceived by the human as being a one-degree temperature change. As such, the psychophysical model optimizes a relationship between the blending parameter and the feedback parameter such that sensory feedback that is based upon the feedback parameter is perceived by the operator of the vehicle to be proportional to the blending parameter. In an example, the feedback modality is a haptic feedback device, a temperature changing device, or a lighting device and the sensory feedback is haptic, thermal, or visual, respectively. The feedback parameter may include a frequency of vibration, an amplitude of vibration, a waveform of vibration, a temperature, a wavelength of the light, a luminance of the light, or a number of lights illuminated. The feedback parameter is based upon factors that influence human perception, such as ambient temperature, ambient light levels, etc. The blending parameter notification system causes the feedback modality to provide the sensory feedback to the operator of the vehicle based upon the feedback parameter. The feedback modality provides the feedback through a steering apparatus of the vehicle, such as by vibrating the steering apparatus, setting a grip of the steering apparatus at a temperature, or illuminating one or more lights disposed within the steering apparatus. In this manner, the blending parameter notification system communicates the blending parameter to the operator of the vehicle in a manner that is readily perceived by the operator.

In one embodiment, a computing system for communicating a blending parameter of a vehicle via a feedback modality of a steering apparatus of the vehicle is disclosed. The computing system includes a processor and memory communicably coupled to the processor. The memory stores instructions that, when executed by the processor, cause the processor to obtain the blending parameter, wherein the blending parameter is indicative of a degree to which control of the vehicle is shared between an operator of the vehicle and an advanced driver-assistance system (ADAS) of the vehicle. The instructions further cause the processor to determine a feedback parameter based upon the blending parameter and a psychophysical model, wherein the psychophysical model optimizes a relationship between the blending parameter and the feedback parameter such that sensory feedback that is based upon the feedback parameter is perceived to be proportional to the blending parameter. The instructions further cause the processor to cause the feedback modality to provide the sensory feedback to the operator of the vehicle based upon the feedback parameter.

In one embodiment, a non-transitory computer-readable medium for communicating a blending parameter of a vehicle via a feedback modality of a steering apparatus of the vehicle and including instructions that, when executed a processor, cause the processor to perform one or more functions is disclosed. The instructions cause the processor to obtain the blending parameter, wherein the blending parameter is indicative of a degree to which control of the vehicle is shared between an operator of the vehicle and an advanced driver-assistance system (ADAS) of the vehicle. The instructions further cause the processor to determine a feedback parameter based upon the blending parameter and a psychophysical model, wherein the psychophysical model optimizes a relationship between the blending parameter and the feedback parameter such that sensory feedback that is based upon the feedback parameter is perceived to be proportional to the blending parameter. The instructions further cause the processor to cause the feedback modality to provide the sensory feedback to the operator of the vehicle based upon the feedback parameter.

In one embodiment, a method for is disclosed. In one embodiment, the method includes obtaining a blending parameter that is indicative of a degree to which control of a vehicle is shared between an operator of the vehicle and an advanced driver-assistance system (ADAS) of the vehicle. The method further includes determining a feedback parameter based upon the blending parameter and a psychophysical model, wherein the psychophysical model optimizes a relationship between the blending parameter and the feedback parameter such that sensory feedback based upon the feedback parameter is perceived to be proportional to the blending parameter. The method further includes causing a feedback modality of a steering apparatus of the vehicle to provide the sensory feedback based upon the feedback parameter.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
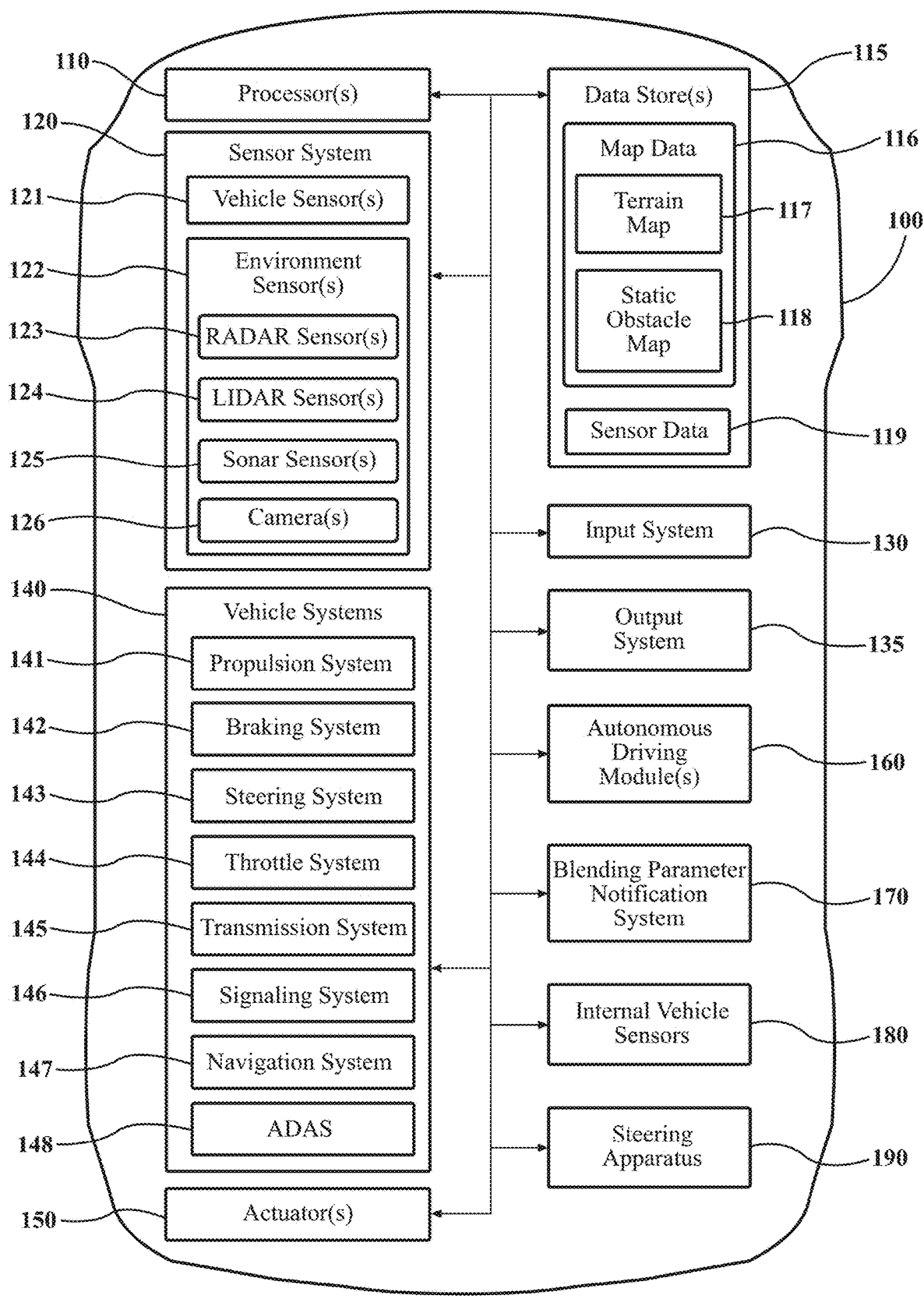
FIG. 1 illustrates one embodiment of a vehicle within which systems and methods disclosed herein may be implemented.

Systems, methods, and other embodiments associated with improving communication of a blending parameter of a vehicle to an operator of the vehicle through use of a psychophysical model are disclosed herein. As noted above, an ADAS may be equipped with shared control functionality, where responsibility for a task is shared between an operator (i.e., a human driver) of the vehicle and the ADAS. For instance, the ADAS may be equipped with a lane-keeping assist system which provides corrective torque feedback to a steering apparatus of the vehicle to influence the operator of the vehicle to maintain the vehicle in a current lane. A conventional ADAS may tend to be deficient with respect to communicating a degree to which control is shared between the operator and the conventional ADAS. Furthermore, the conventional ADAS may tend not to account for factors that influence human perception when communicating information to the operator.

Additionally, the above-referenced problem is further exacerbated in situations in which a vehicle utilizes a steer-by-wire (SbW) steering system (sometimes referred to as an uncoupled steering system). In a coupled steering system, a steering apparatus is mechanically linked to a steering rack of the vehicle that changes orientations of tires of the vehicle. As such, in a coupled steering system, there is a clear relationship between an angle of the steering apparatus and a position of the steering rack (i.e., the steering direction). However, in a SbW steering system, there is no mechanical linkage between the steering apparatus and the steering rack. Instead, the relationship between the angle of the steering apparatus and the position of the steering rack (i.e., the steering direction) is defined by software, that is, the angle of the steering apparatus is an input that is considered by the software. Depending on the situation, the SbW steering system can use the input differently. In an example involving a vehicle with a SbW system and an ADAS with shared control functionality, an operator of the vehicle may be become alarmed when the ADAS is exerting a relatively large amount of control over the vehicle, as the vehicle may travel in a direction that does not correspond to a current angle of the steering apparatus from the perspective of the operator. Although SbW steering systems are not currently in widespread use, such steering systems may become prevalent in the future due to the greater degrees of freedom provided.

To address these issues, a blending parameter notification system ("a system") is described herein. The system obtains a blending parameter from an ADAS of a vehicle as the vehicle navigates about an environment. The vehicle may have a SbW steering system. The blending parameter is indicative of a degree to which control of the vehicle is shared between an operator of the vehicle and the ADAS. According to embodiments, a value of the blending parameter ranges from zero (full control of the vehicle by the operator) to one (full control of the vehicle by the ADAS). In an example, the ADAS increases the blending parameter from a first value to a second value in response to detecting that a current angle of a steering apparatus of the vehicle is insufficient to avoid an obstacle in an environment of the vehicle. In another example, the ADAS increases the blending parameter from the first value to the second value even when the current angle of the steering apparatus is sufficient to avoid the obstacle.

The system determines a feedback parameter based upon the blending parameter and a psychophysical model. Human perception of a physical quantity (e.g., vibration, temperature, light) tends to be non-linear with respect to the perceived physical quantity. In an example, a one-degree temperature change of a material being touched by a human may not be perceived by the human as being a one-degree temperature change. As such, the psychophysical model optimizes a relationship between the blending parameter and the feedback parameter such that sensory feedback that is based upon the feedback parameter is perceived to be proportional (e.g., linear) to the blending parameter. According to embodiments, the feedback parameter is a frequency of vibration, an amplitude of vibration, a waveform of vibration, a temperature, a wavelength of light, a luminance of the light, and/or a number of lights illuminated. The psychophysical model may account for factors such as a sex of the operator, a weight of the operator, vibrations being undergone by the vehicle, force applied to the steering apparatus by a hand of the operator of the vehicle, a skin temperature of the hand of the operator that grips the steering apparatus, an ambient temperature of a cabin of the vehicle, a temperature of a grip of the steering apparatus, a humidity level within the cabin, a material from which the grip is made, an ambient light level within the cabin, and/or predetermined characteristics of human perception in optimizing the relationship between the blending parameter and the feedback parameter, that is, the feedback parameter is based upon one or more of the aforementioned factors. The system causes a feedback modality (e.g., a haptic feedback device, a temperature changing device, or a lighting device) associated with (e.g., integrated into) the steering apparatus to provide the sensory feedback to the operator of the vehicle based upon the feedback parameter. For instance, the system causes the feedback modality to vibrate the steering apparatus, change a temperature of the steering apparatus, and/or emit light from the steering apparatus.

The above-described technologies present various advantages over conventional functionality provided by an ADAS. First, through use of the psychophysical model, the system described above helps to ensure that an operator of a vehicle is accurately informed of a blending parameter, that is, the operator is accurately informed of a degree of control shared between the ADAS and the operator. For example, if the ADAS is exercising a relatively large amount of control of the vehicle, the system can illuminate the steering apparatus with relatively bright light, whereas if the ADAS is exercising a relatively small amount of control of the vehicle, the system can illuminate the steering apparatus with relatively dim light. Second, the system described above can communicate the blending parameter even when the operator of the vehicle is operating the vehicle in accordance with the suggestions/recommendations of the ADAS. Thus, the system described above helps to build a mental model of the blending parameter in a mind of the operator. Third, the system described above is useful in a vehicle that has a SbW steering system. Fourth, by providing sensory feedback through a steering apparatus of the vehicle, the system described above conditions the operator of the vehicle to associate the sensory feedback with steering.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with improving communication of a blending parameter to an operator of a vehicle via a psychophysical model. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a blending parameter notification system 170 that is implemented to perform methods and other functions as disclosed herein relating to improving communication of a blending parameter of the vehicle 100 to an operator of the vehicle 100. The vehicle 100 also includes ADAS 148 and a steering apparatus 190. The vehicle 100 may also include internal vehicle sensors 180. As will be discussed in greater detail subsequently, the blending parameter notification system 170, in various embodiments, is implemented partially within the vehicle 100, and as a cloud-based service. For example, in one approach, functionality associated with at least one module of the blending parameter notification system 170 is implemented within the vehicle 100 while further functionality is implemented within a cloud-based computing system.

Figure 2:
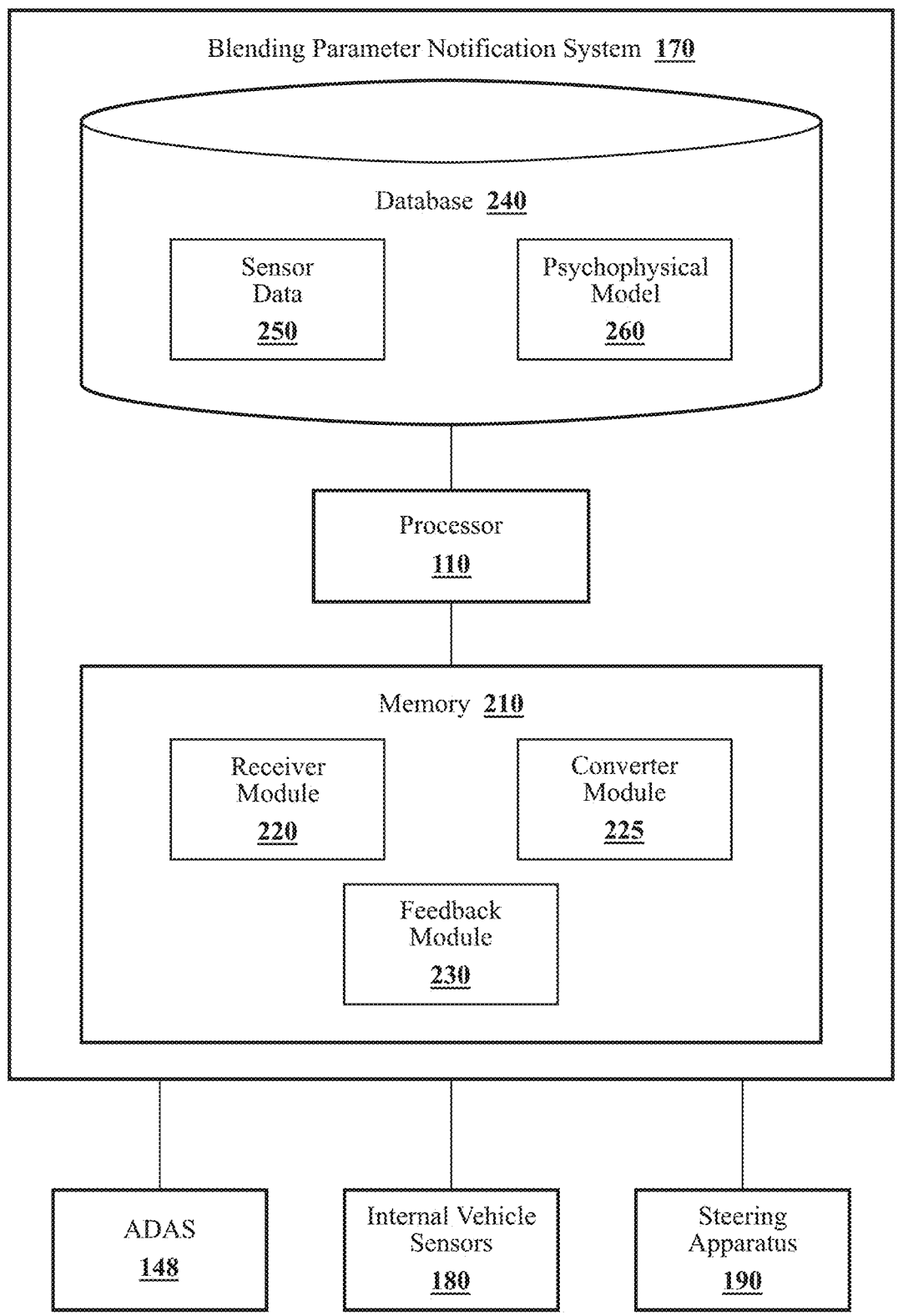
FIG. 2 illustrates one embodiment of a blending parameter notification system that is associated with communicating a blending parameter.

With reference to FIG. 2, one embodiment of the blending parameter notification system 170 of FIG. 1 is further illustrated. The blending parameter notification system 170 is in communication with the ADAS 148, the internal vehicle sensors 180, and the steering apparatus 190. According to embodiments, the blending parameter notification system 170 is part of the ADAS 148. The blending parameter notification system 170 is shown as including a processor 110 from the vehicle 100 of FIG. 1. Accordingly, the processor 110 may be a part of the blending parameter notification system 170, the blending parameter notification system 170 may include a separate processor from the processor 110 of the vehicle 100, or the blending parameter notification system 170 may access the processor 110 through a data bus or another communication path. In one embodiment, the blending parameter notification system 170 includes a memory 210 that stores a receiver module 220, a converter module 225, and a feedback module 230. The memory 210 is a random-access memory (RAM), read-only memory (ROM), a hard-disk drive, a flash memory, or other suitable memory for storing the receiver module 220, the converter module 225, and the feedback module 230. The receiver module 220, the converter module 225, and the feedback module 230 are, for example, computer-readable instructions that when executed by the processor 110 cause the processor 110 to perform the various functions disclosed herein.

The blending parameter notification system 170 as illustrated in FIG. 2 is generally an abstracted form of the blending parameter notification system 170 and may be implemented between the vehicle 100 and a cloud-computing environment.

With reference to FIG. 2, the receiver module 220 generally includes instructions that function to control the processor 110 to receive data inputs from the ADAS 148. For instance, the receiver module 220 obtains a blending parameter from the ADAS 148. The blending parameter is indicative of a degree to which control of the vehicle 100 is shared between an operator of the vehicle 100 and the ADAS 148. For instance, when a value of the blending parameter is a first value, the operator of the vehicle 100 is in full control of the vehicle 100. When the value of the blending parameter is a second value, the ADAS 148 is in full control of the vehicle 100. When the value of the blending parameter is a third value that is between the first value and the second value (exclusive), control of the vehicle 100 is shared between the operator and the ADAS 148.

According to embodiments, a value of the blending parameter ranges from zero to one. When the value of the blending parameter is zero, the operator is in full control of the vehicle 100. When the value of the blending parameter is one, the ADAS 148 is in full control of the vehicle 100. When the value of the blending parameter is between zero and one (exclusive), control of the vehicle 100 is being shared between the operator and the ADAS 148. For instance, when the value of the blending parameter approaches zero, the operator has a relatively greater amount of control over the vehicle 100 and the ADAS 148 has a relatively lower amount of control over the vehicle 100. When the value of the blending parameter approaches one, the ADAS 148 has a relatively greater amount of control over the vehicle 100 and the operator has a relatively lower amount of control over the vehicle 100.

The converter module 225 generally includes instructions that function to control the processor 110 to receive data inputs from the receiver module 220. For instance, the converter module 225 obtains the blending parameter from the receiver module 220. As will be explained in greater detail below, the converter module 225 is generally configured optimize a relationship between the blending parameter and a feedback parameter such that sensory feedback that is based upon the feedback parameter is perceived as being proportional (e.g., linear, substantially linear) to the blending parameter.

The feedback module 230 generally includes instructions that function to control the processor 110 to receive data inputs from the converter module 225. For instance, the feedback module 230 receives a frequency of vibration, an amplitude of vibration, a temperature, a wavelength of light (i.e., a color), and/or a luminance of the light from the converter module 225. As will be explained in greater detail below, the feedback module 230 is configured to transmit a signal to one or more feedback modalities, where the signal causes the one or more feedback modalities to provide sensory feedback to the operator of the vehicle 100.

Moreover, in one embodiment, the blending parameter notification system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the receiver module 220, the converter module 225, and the feedback module 230 in executing various functions. In one embodiment, the database 240 includes a sensor data 250 along with, for example, metadata that characterize various aspects of the sensor data 250. The sensor data 250 may be generated by one or more sensor systems 120 of the vehicle 100. For example, the metadata can include location coordinates (e.g., longitude and latitude), relative map coordinates or tile identifiers, time/date stamps from when the sensor data 250 was generated, and so on.

The database 240 further includes a psychophysical model 260. In general, the psychophysical model 260 is configured to optimize a relationship between a blending parameter and a feedback parameter (e.g., a frequency of vibration) such that sensory feedback (e.g., a vibration) that is based upon the feedback parameter is perceived by an operator of the vehicle 100 as being proportional to the blending parameter. According to some embodiments, the psychophysical model 260 comprises a perceptually uniform color map. According to some embodiments, the psychophysical model 260 utilizes an International Commission on Illumination (CIELAB) color space.

Figure 3:
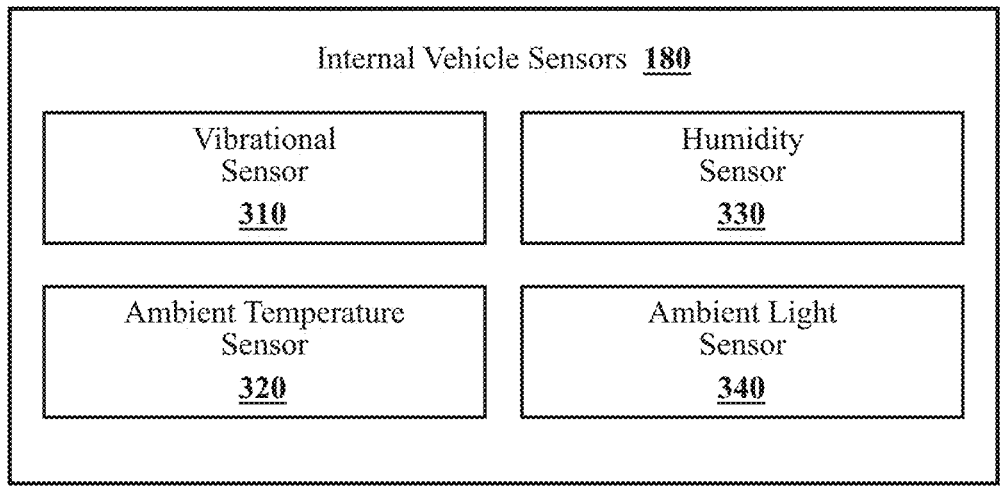
FIG. 3 illustrates one embodiment of internal vehicle sensors.

Referring now to FIG. 3, an example of the internal vehicle sensors 180 is depicted. The internal vehicle sensors 180 may include a vibrational sensor 310 that is configured to generate measurements of amplitudes and/or frequencies of vibrations undergone by the vehicle 100 and/or the steering apparatus 190 as the vehicle 100 navigates around an environment. The internal vehicle sensors 180 may include an ambient temperature sensor 320 that is configured to generate a measurement of an ambient temperature of a cabin of the vehicle 100. The internal vehicle sensors 180 may include a humidity sensor 330 that is configured to generate a measurement of a humidity level of a cabin of the vehicle 100. The internal vehicle sensors 180 may include an ambient light sensor 340 that is configured to generate a measurement of an ambient light level within the cabin of the vehicle 100.

Figure 4:
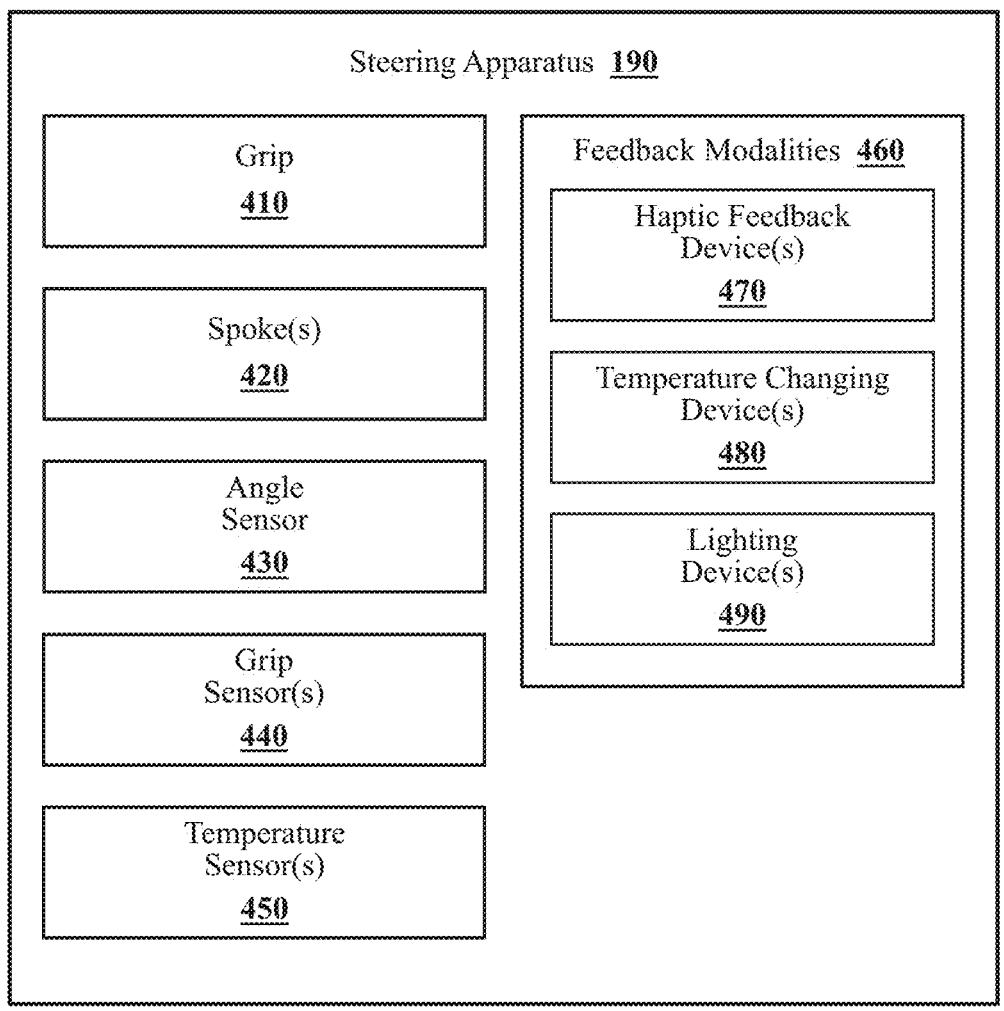
FIG. 4 illustrates one embodiment of a steering apparatus.

Referring now to FIG. 4, an example of the steering apparatus 190 is depicted. According to embodiments, the steering apparatus 190 is a steering wheel. The steering apparatus 190 includes a grip 410 that is configured to be gripped by an operator of the vehicle 100. The grip 410 may circular, substantially circular, or another shape. The steering apparatus 190 may include one or more spokes 420 that connect portions of the grip 410 of the steering apparatus 190.

The steering apparatus 190 includes an angle sensor 430 that is configured to generate a measurement of a current angle of the steering apparatus 190. The steering apparatus 190 may include one or more grip sensors 440 (referred to now herein as "the grip sensor 440"). The grip sensor 440 may be configured to generate a measurement of force applied by a hand (or hands) of the operator of the vehicle 100 to the grip 410 while the hand grips the grip 410. The grip sensor 440 may also be configured to generate data that is indicative of a number of hands of the operator that grip the grip 410 and/or a location of the hands on the grip 410. The grip sensor 440 may also be configured to generate data that is indicative of a size of a hand of the operator on the grip 410. As such, the grip sensor 440 may be or include a force-based sensor, a pressure-based sensor, and/or an optical sensor. The steering apparatus 190 may include one or more temperature sensors 450 (referred to now herein as "the temperature sensor 450") that is configured to generate a measurement of a temperature of skin on a hand of the operator as the hand grips the grip 410. The temperature sensor may also be configured to generate a measurement of a temperature of the grip 410 of the steering apparatus 190.

The angle sensor 430, the grip sensor 440, and the temperature sensor 450 may be considered to be part of the internal vehicle sensors 180.

The steering apparatus 190 includes one or more feedback modalities 460 (referred to now herein as "the feedback modalities 460"). In general, the feedback modalities 460 are configured to provide sensory feedback to an operator of the vehicle 100.

The feedback modalities 460 may include at least one haptic feedback device 470 (referred to now herein as "the haptic feedback device 470") that is configured to vibrate the steering apparatus 190. The haptic feedback device 470 may be incorporated into the grip 410 of the steering apparatus 190. The haptic feedback device 470 can vibrate the steering apparatus 190 along a rotational axis of the steering apparatus 190 and/or a translatory axis of the steering apparatus 190. Additionally or alternatively, the haptic feedback device 470 may be configured to provide torque feedback to the steering apparatus 190. It is to be understood that the haptic feedback device 470 may be or include one or more actuators in order to produce vibrations and/or torque.

The feedback modalities 460 may include at least one temperature changing device 480 (referred to now herein as "the temperature changing device 480") that is configured to heat and/or cool the grip 410 of the steering apparatus 190. The temperature changing device 480 may be incorporated into the grip 410. The temperature changing device 480 may be or include a Peltier device.

The feedback modalities 460 may include at least one lighting device 490 (referred to now herein as "the lighting device 490") that is configured to emit light. The lighting device 490 may be incorporated into the grip 410 of the steering apparatus 190. According to embodiments, the lighting device 490 is a light emitting diode (LED). The lighting device 490 may be configured to emit light of different colors and/or brightness when perceived by the operator of the vehicle 100. According to embodiments, the lighting device 490 comprises a plurality of lights that are disposed within the grip 410.

Figure 5:
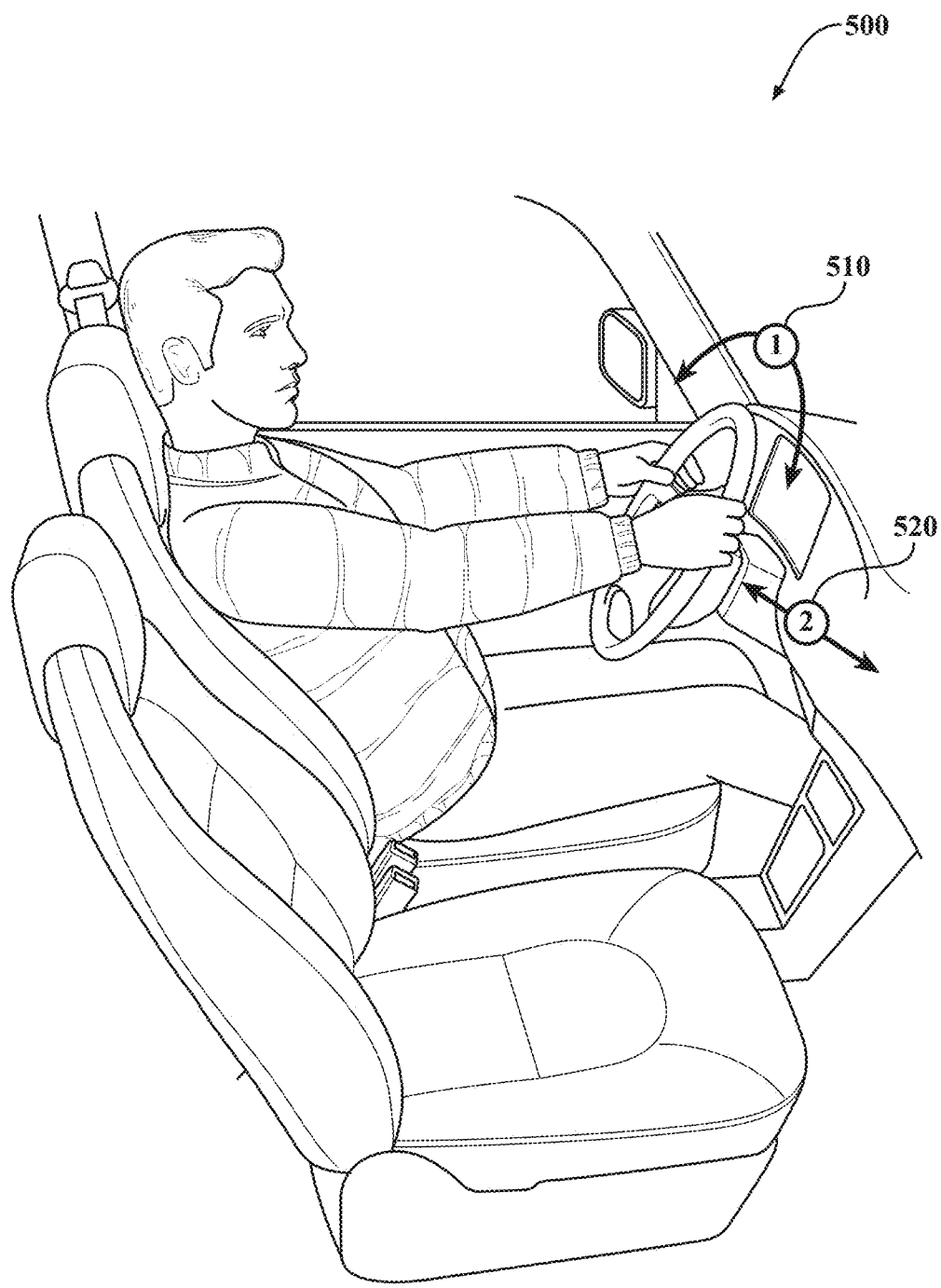
FIG. 5 depicts a side view of a steering apparatus and an operator of a vehicle according to one embodiment.

Referring now to FIG. 5, a side view 500 of an operator of the vehicle 100 and the steering apparatus 190 is illustrated. As noted above and as will be described in further detail below, the haptic feedback device 470 may vibrate the steering apparatus 190 along a rotational axis 510 and/or a translatory axis 520 of the steering apparatus 190.

Figure 6:
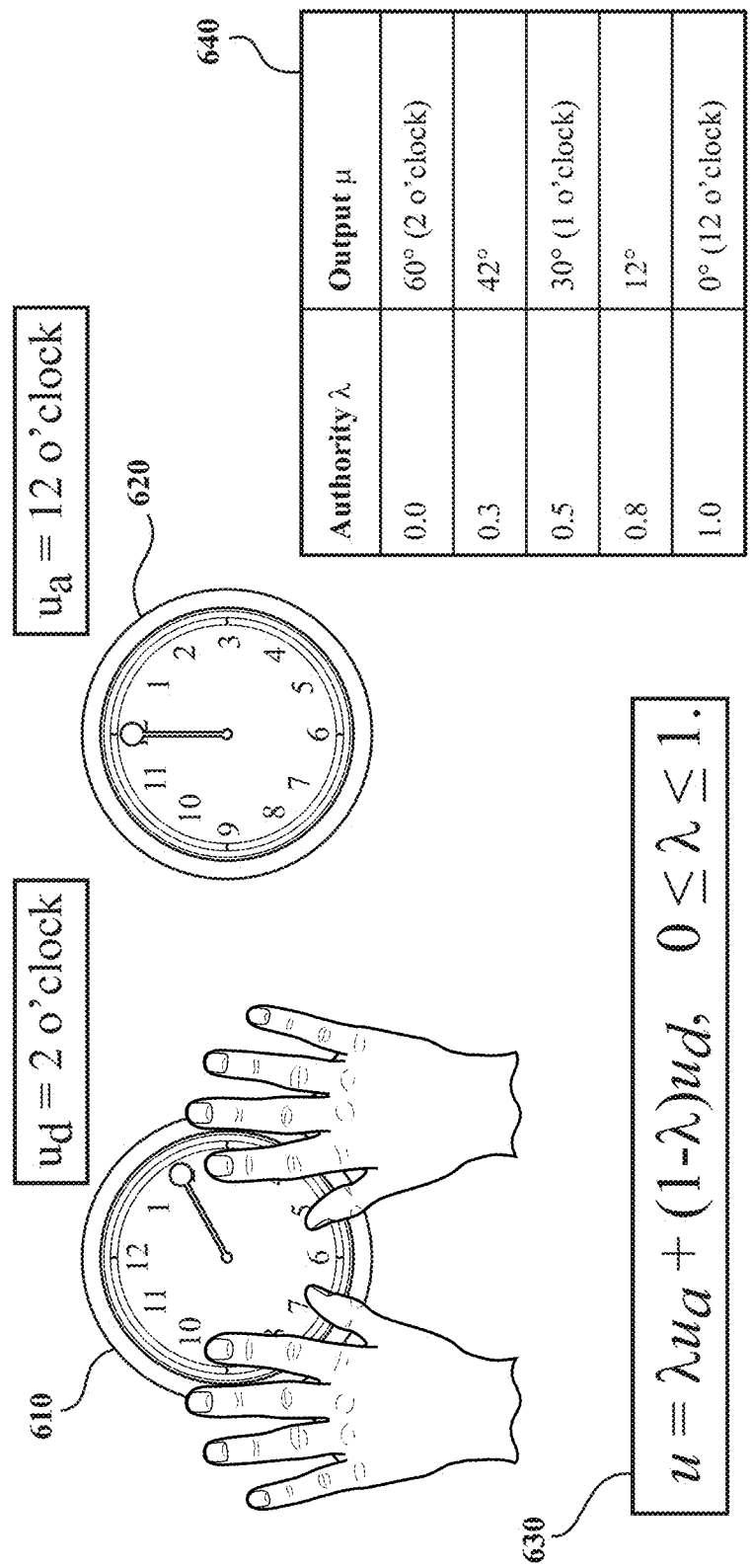
FIG. 6 depicts information pertaining to a blending parameter according to one embodiment.

Referring now to FIG. 6, information pertaining to a blending parameter according to an embodiment is illustrated. The blending parameter may be alternatively referred to as lambda ($\lambda$) or as an authority parameter. As noted above, the ADAS 148 may include shared control functionality in which the ADAS 148 and the operator of the vehicle 100 share control over a task (e.g., lane changing, obstacle avoidance, etc.). The blending parameter is indicative of a degree to which control of the vehicle 100 is shared between an operator of the vehicle 100 and the ADAS 148. The ADAS 148 determines the blending parameter based upon the sensor data 250 as the vehicle 100 navigates about an environment. The ADAS 148 may also determine the blending parameter based upon other data, such as data from a map, data from the internal vehicle sensors 180, etc. Stated differently, the ADAS 148 determines a recommended steering direction, which is expressed as a recommended angle of the steering apparatus 190 or as a recommended steering rack position. The recommended angle of the steering apparatus 190 may differ from an actual angle of the steering apparatus 190 as positioned by the operator. For instance, FIG. 6 depicts an example 610 in which an angle of the steering apparatus 190 as positioned by the operator of the vehicle 100 is 60° (i.e., 2 o'clock). FIG. 6 also depicts an example 620 in which the recommended angle of the steering apparatus 190 as determined by the ADAS 148 is 0° (i.e., 12 o'clock).

FIG. 6 further depicts an equation 630 that determines a steering direction of the vehicle 100 according to an embodiment. The equation 630 is reproduced below for purposes of explanation.

$$u = \lambda u_a + (1-\lambda)u_d, \quad 0 \leq \lambda \leq 1 \qquad (I)$$

In the equation 630, $\lambda$ is the blending parameter and may take values that range from zero to one (inclusive), $u_a$ is a recommended angle of the steering apparatus 190 as determined by the ADAS 148, $u_d$ is an angle of the steering apparatus 190 as positioned by the operator of the vehicle 100, and u is an angle at which the vehicle 100 travels. FIG. 6 includes a table 640 that details the result of differing values of the blending parameter ($\lambda$) on the steering output according to the example 610 and the example 620 described above. As illustrated in the table 640, when $\lambda$=0.0, the output u is 60°, that is, the operator has full control of the vehicle 100. When $\lambda$=1.0, the output u is 0° (i.e., straight), that is, the ADAS 148 has full control of the vehicle 100 such that the vehicle 100 travels in a direction independent of an actual angle of the steering apparatus 190. However, when $\lambda$=0.5, the output u is 30° and the operator and the ADAS 148 share control of the vehicle 100, that is, the vehicle 100 travels in a direction that is a blend of a direction as input by the operator via the actual angle of the steering apparatus 190 and the recommended angle as determined by the ADAS 148.

Figure 7:
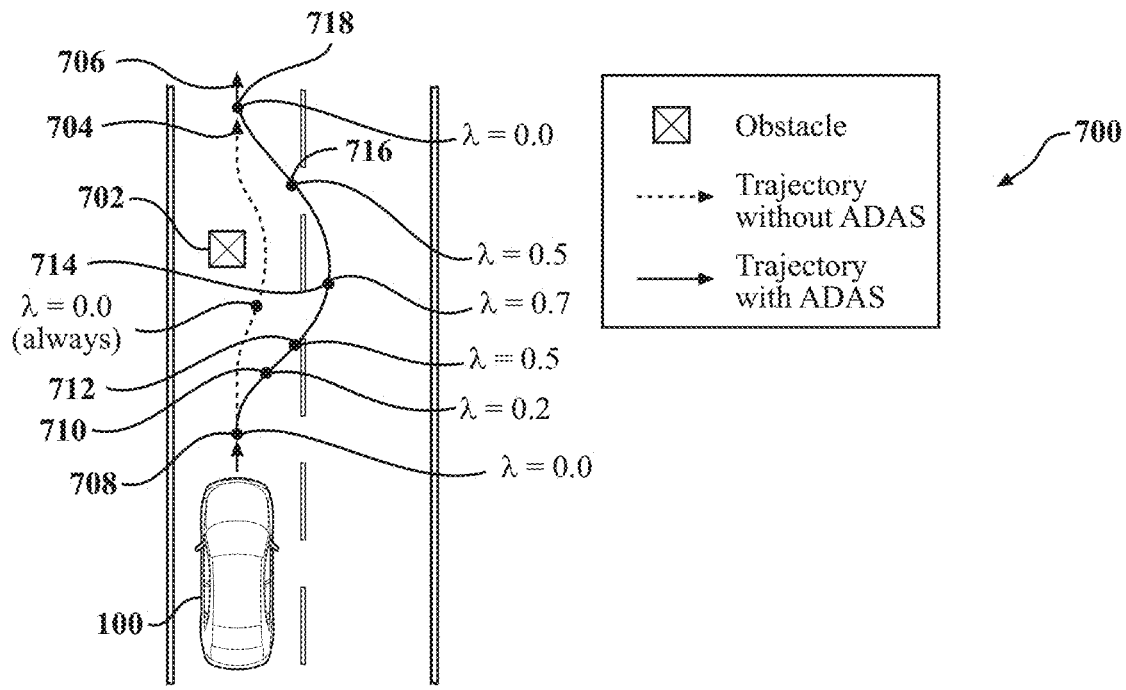
FIG. 7 illustrates an overhead view of a scene in which a blending parameter of a vehicle is varied over time.

Referring now to FIG. 7, an example overhead scene 700 is depicted in which a blending parameter is varied over time. The overhead scene 700 includes the vehicle 100 that is traveling along a road. An obstacle 702 is present on the road, such as a pedestrian, debris, a stopped vehicle, etc. FIG. 7 also depicts a projected future path 704 (illustrated by a dotted line) of the vehicle 100 if the ADAS 148 were not providing assistance to an operator of the vehicle 100, that is, the projected future path 704 is a path the vehicle 100 would follow if the blending parameter ($\lambda$) was zero and the operator of the vehicle 100 was in full control of the vehicle 100.

FIG. 7 also depicts a projected future path 706 (illustrated by a solid line) of the vehicle 100 when the ADAS 148 provides assistance to the operator of the vehicle 100, that is, the projected future path 706 is a path the vehicle 100 follows when the ADAS 148 varies the blending parameter ($\lambda$). For instance, when the vehicle 100 is at position 708 at a first time, the ADAS 148 determines that driving intervention is not required based upon the sensor data 250. As such, the ADAS 148 sets $\lambda$=0.0. However, when the vehicle 100 is at position 710 at a second time, the ADAS 148 determines that driving intervention is necessary for the vehicle 100 to avoid colliding with the obstacle 702, that is, a current angle of the steering apparatus 190 is insufficient to avoid the obstacle 702. As such, the ADAS 148 sets $\lambda$=0.2. When the vehicle 100 is at position 712 at a third time, the ADAS 148 sets $\lambda$=0.5. When the vehicle 100 is at a position 714 at a fourth time, the ADAS 148 sets $\lambda$=0.7. When the vehicle 100 is at a position 716 at a fifth time, the ADAS 148 sets $\lambda$=0.5. Finally, when the vehicle 100 is at a position 718 at a sixth time, the ADAS 148 sets $\lambda$=0.0.

Figure 8:
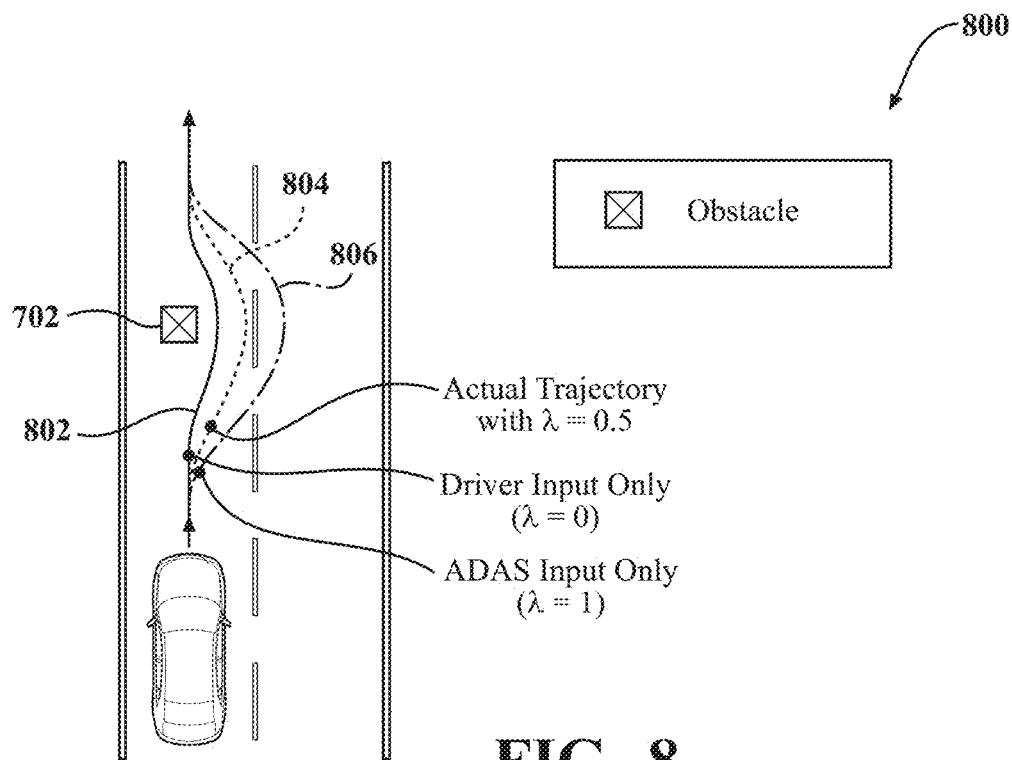
FIG. 8 illustrates an overhead view of scene depicting paths of a vehicle according to different blending parameter values.

Referring now to FIG. 8, an example overhead scene 800 is depicted in which a blending parameter is kept constant over time. The overhead scene 800 includes the vehicle 100 and the obstacle 702 described above. The overhead scene 800 depicts a first path 802 in which λ is kept constant at 0.0 over time, a second path 804 in which λ is kept constant at 0.5 over time, and a third path 806 in which lambda is kept constant at 1.0 over time.

Example operation of the blending parameter notification system 170 is now set forth. It is contemplated that the vehicle 100 is navigating about an environment while being operated by an operator. The receiver module 220 of the blending parameter notification system 170 obtains a blending parameter from the ADAS 148. The blending parameter is indicative of a degree to which control of the vehicle 100 is shared between an operator of the vehicle 100 and the ADAS 148. According to an embodiment, the blending parameter ranges from zero to one (inclusive). When a value of the blending parameter is zero, the operator of the vehicle 100 has full control of the vehicle 100, that is, a trajectory of the vehicle 100 is not influenced by the ADAS 148. When a value of the blending parameter is one, the ADAS 148 has full control of the vehicle 100, that is, the trajectory of the vehicle 100 is determined by the ADAS 148 and not a current angle of the steering apparatus 190 as positioned by the operator. When a value of the blending parameter is a number between zero and one (e.g., 0.3, 0.5, 0.7, etc.), control of the vehicle 100 is shared between the operator and the ADAS 148, that is, the trajectory of the vehicle 100 is influenced by both a current angle of the steering apparatus 190 and the ADAS 148.

The ADAS 148 may change the blending parameter from a first value (e.g., 0.0) to a second value (e.g., 0.5) in response to detecting a risk, such as an object in a path of the vehicle 100. In an example, the ADAS 148 obtains the sensor data 250, where the sensor data 250 is indicative of positions and/or headings of objects in an environment of the vehicle 100 and/or a speed and heading of the vehicle 100. The ADAS 148 also obtains a current angle of the steering apparatus 190, where the current angle of the steering apparatus 190 is generated by the angle sensor 430. The ADAS 148 determines that the current angle of the steering apparatus 190 is insufficient to avoid a collision with an object in the environment based upon the sensor data 250. The ADAS 148 may change the blending parameter from a first value (e.g., 0.0) to a second value (e.g., 0.5) in response detecting that the current angle of the steering apparatus 190 is insufficient to avoid the collision.

The receiver module 220 provides the blending parameter to the converter module 225. The converter module 225 determines a feedback parameter based upon the blending parameter and the psychophysical model 260. As noted above, human perception of a physical quantity tends to be non-linear with respect to the perceived physical quantity. For instance, a temperature change of 1° F. of the grip 410 of the steering apparatus 190 may not be perceived by the operator as a 1° F. temperature change. The psychophysical model 260 optimizes a relationship between the blending parameter and the feedback parameter such that sensory feedback based upon the feedback parameter is perceived by the operator of the vehicle 100 to be proportional to the blending parameter. In optimizing the relationship between the blending parameter and the feedback parameter, the psychophysical model 260 may account for factors that influence human perception such as characteristics of the operator of the vehicle 100 (e.g., sex, weight, skin temperature of a hand of the operator that grips the grip 410, force applied by the operator to the grip 410 of the steering apparatus 190, etc.), predetermined characteristics of human perception, and/or characteristics of the vehicle 100 (e.g., ambient temperature of a cabin of the vehicle 100, a temperature of the grip 410, a humidity level within the cabin of the vehicle 100, amplitudes and frequencies of vibrations of the vehicle 100 as the vehicle 100 travels about an environment, an ambient light level within the cabin of the vehicle 100, a material from which the grip is made, etc.). Stated differently, the feedback parameter may be based upon one or more of the factors detailed above. The converter module 225 may determine some or all of the aforementioned factors based upon sensor data generated by the internal vehicle sensors 180.

In an example, the converter module 225 maps the blending parameter to a target feedback parameter. The converter module 225 converts the target feedback parameter to a converted target feedback parameter (i.e., the feedback parameter discussed above) using the psychophysical model 260, which, as noted above, accounts for factors that influence human perception such as an ambient temperature within a cabin of the vehicle 100, an ambient light level within the cabin of the vehicle 100, etc. When a feedback modality in the feedback modalities 460 provides sensory feedback based upon the converted target feedback parameter, the operator of the vehicle 100 perceives the sensory feedback as having the target feedback parameter, even though the feedback modality has provided the sensory feedback according to the converted target feedback parameter. Various embodiments with respect to vibration, temperature, and light sensory feedback are discussed below.

According to embodiments, the sensory feedback is a vibration that is experienced by the operator through the steering apparatus 190 as the operator grips the grip 410 of the steering apparatus 190. The feedback parameter may include one or more of a torque amplitude along a rotational axis of the steering apparatus 190, a force amplitude along a translatory axis of the steering apparatus 190, a rotational displacement amplitude along the rotational axis, a translatory displacement amplitude along the translatory axis, a frequency of vibration, and/or a waveform of vibration (e.g., sinusoidal, rectangular, etc.).

The converter module 225 maps the blending parameter to a target feedback parameter (e.g., a frequency of vibration, a target amplitude of vibration, etc.). In an example involving frequency of vibration, the converter module 225 maps the blending parameter to a value on a frequency scale. In an example, the frequency scale ranges from 50 Hz to 150 Hz, where 10 Hz corresponds to a blending parameter of zero and 150 Hz corresponds to a blending parameter of one. For instance, if the blending parameter is 0.5, the converter module 225 maps the blending parameter to 100 Hz. In another example, the frequency scale ranges from 0 Hz to 100 H, where 0 Hz (e.g., no vibration) corresponds to a blending parameter of zero and 100 Hz corresponds to a blending parameter of one.

The converter module 225 converts the target feedback parameter into a converted target feedback parameter using the psychophysical model 260. The converted target feedback parameter is of the same type (e.g., frequency of vibration) as the target feedback parameter, but a value of the converted target feedback parameter may be different than a value of the target feedback parameter. In an example, the converter module 225 provides the target feedback parameter as input to the psychophysical model 260 and the converter module 225 obtains the converted target feedback parameter as output of the psychophysical model 260. The psychophysical model 260 accounts for the factors that influence human perception described above, such as a predetermined characteristics of human perception with respect to vibration, a sex of the operator, a weight of the operator, a hand size of the operator, a force applied to the grip 410 of the steering apparatus 190 by a hand of the operator, amplitudes and frequencies of vibrations of the vehicle 100 as the vehicle 100 travels about an environment, and/or a material from which the grip 410 is made.

According to embodiments, the sensory feedback is a temperature of the grip 410 that is experienced by a hand of the operator as skin of the hand makes contact with the grip 410 while the hand grips the grip 410. The converter module 225 maps the blending parameter to a target feedback parameter (e.g., temperature). Thus, the sensory feedback and the feedback parameter are both temperature. In an example, the converter module 225 maps the blending parameter to a value on a temperature scale. In an example, the temperature scale ranges from 60° F. to 70° F., where 60° F. corresponds to a blending parameter of zero and 70° F. corresponds to a blending parameter of one. For instance, if the blending parameter is 0.5, the converter module 225 maps the blending parameter to 65° F. In another example, the temperature scale is defined with respect to a current temperature of the grip 410 of the steering apparatus 190. For instance, the temperature scale may range from a current temperature of the grip to a temperature that is 10° F. greater than (or less than) the current temperature of the grip 410.

The converter module 225 converts the target feedback parameter into a converted target feedback parameter using the psychophysical model 260. The converted target feedback parameter is of the same type (e.g., temperature) as the target feedback parameter, but a value of the converted target feedback parameter may be different than a value of the target feedback parameter. In an example, the converter module 225 provides the target feedback parameter as input to the psychophysical model 260 and the converter module 225 obtains the converted target feedback parameter as output of the psychophysical model 260. The psychophysical model 260 accounts for the factors that influence human perception described above, such as predetermined characteristics of human perception with respect to temperature, a sex of the operator, a weight of the operator, a hand size of the operator, a force applied to the grip 410 of the steering apparatus 190 by a hand of the operator, a skin temperature of a hand of the operator that makes contact with the grip 410, a temperature of the grip 410, an ambient temperature of a cabin of the vehicle 100, a humidity level within the cabin, and/or a material from which the grip 410 is made.

According to embodiments, the sensory feedback is light that is emitted by the lighting device 490. The feedback parameter may include one or more a wavelength of the light (which is related to a color of the light when perceived by the operator) or a luminance of the light (which is related to brightness of the light when perceived by the operator). According to embodiments in which the lighting device 490 comprises a plurality of lights, the feedback parameter may be a number of lights in the plurality of lights.

The converter module 225 maps the blending parameter to a target feedback parameter (e.g., a wavelength of light and/or a luminance). In an example involving wavelength/color, the converter module 225 maps the blending parameter to a value on a wavelength scale. In an example, the wavelength scale ranges from 700 nm (red light) to 400 nm (violet light), where 700 nm corresponds to a blending parameter value of zero and 400 nm corresponds to a blending parameter value of one. For instance, if the blending parameter value is 0.5, the converter module 225 maps the blending parameter to 550 nm (green light). In another example involving luminance, the converter module 225 maps the blending parameter to a value on a luminance scale. In another example involving luminance, a first end of the scale corresponds to off (i.e., no light is emitted) and a second end of the scale corresponds to light of a particular luminance.

The converter module 225 converts the target feedback parameter into a converted targeted feedback parameter using the psychophysical model 260. The converted target feedback parameter is of the same type (e.g., wavelength) as the target feedback parameter, but a value of the converted target feedback parameter may be different than a value of the target feedback parameter. In an example, the converter module 225 provides the target feedback parameter as input to the psychophysical model 260 and the converter module 225 obtains the converted target feedback parameter as output of the psychophysical model 260. The psychophysical model 260 accounts for the factors that influence human perception described above, such as predetermined characteristics of human perception with respect to light, a sex of the operator, and/or an ambient light level within a cabin of the vehicle 100.

The converter module 225 provides the feedback parameter (i.e., the converted target feedback parameter) to the feedback module 230. The feedback module 230 causes a feedback modality in the feedback modalities 460 to provide sensory feedback to the operator of the vehicle 100 via the steering apparatus 190, where the sensory feedback is based upon the feedback parameter. In one example, the feedback module 230 transmits a signal to the haptic feedback device 470 which causes the haptic feedback device 470 to vibrate the steering apparatus 190 with vibrations in accordance with the feedback parameter (e.g., at a particular frequency and amplitude). In another example, the feedback module 230 transmits a signal to the temperature changing device 480 which causes the temperature changing device 480 to set the grip 410 to a temperature. In yet another example, the feedback module 230 transmits a signal to the lighting device 490 which causes the lighting device 490 to emit light in accordance with the feedback parameter (e.g., light that has a particular color and/or brightness when perceived by the operator). In a further example in which the lighting device 490 comprises a plurality of lights, the feedback module 230 transmits a signal to the lighting device 490 which causes the lighting device 490 to illuminate a subset of the plurality of lights, where the subset corresponds to the blending parameter. As noted above, the operator perceives the sensory feedback as being proportional (e.g., linear, substantially linear) to the blending parameter, thus enabling the operator to build a mental model of the blending parameter.

It is to be understood that the blending parameter notification system 170 may provide sensory feedback even when a current angle of the steering apparatus 190 matches a recommended angle of the steering apparatus 190 as determined by the ADAS 148. Stated differently, the sensory feedback provided by the blending parameter notification system 170 may not be dependent upon the current angle of the steering apparatus 190.

Additional aspects of communicating a blending parameter to an operator of a vehicle will be discussed in relation to FIGS. 9 and 10.

Figure 9:
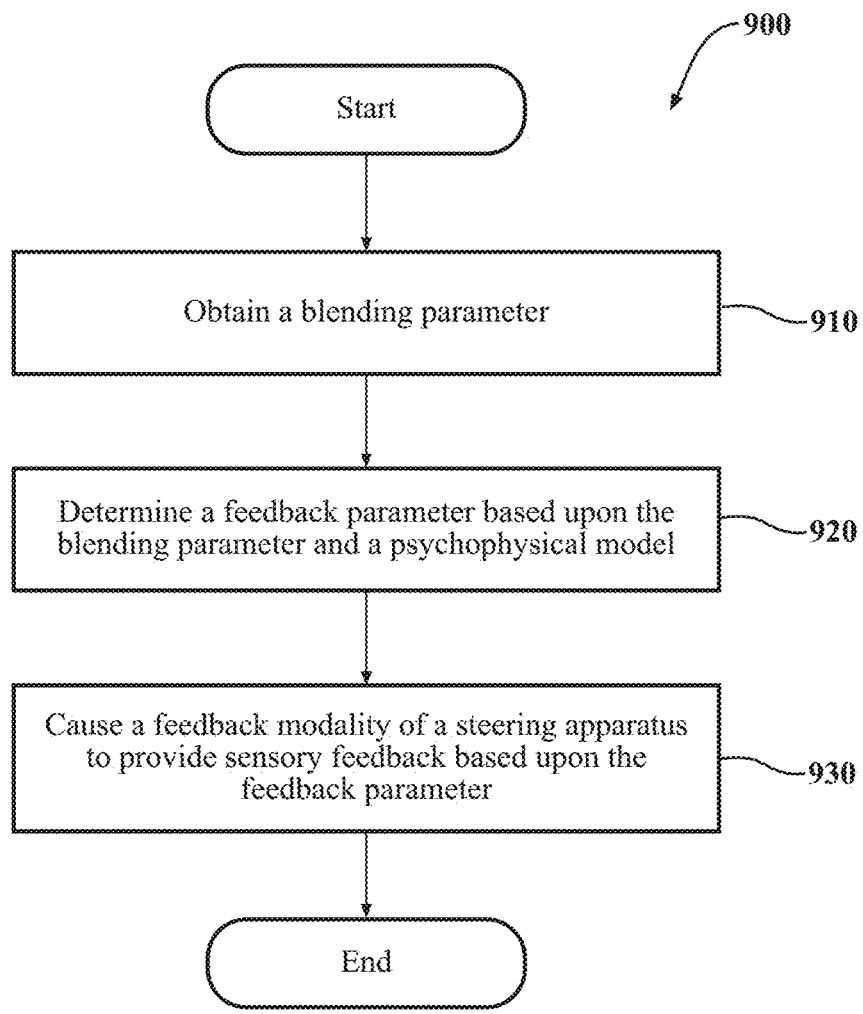
FIG. 9 illustrates one embodiment of a method that is associated with communicating a blending parameter of a vehicle via a feedback modality of a steering apparatus of the vehicle.

FIG. 9 illustrates a flowchart of a method 900 that is associated with communicating a blending parameter to an operator of the vehicle 100. The method 900 will be discussed from the perspective of the blending parameter notification system 170 of FIGS. 1 and 2. While the method 900 is discussed in combination with the blending parameter notification system 170, it should be appreciated that the method 900 is not limited to being implemented within the blending parameter notification system 170 but is instead one example of a system that may implement the method 900.

At 910, the blending parameter notification system 170 obtains a blending parameter from the ADAS 148. As noted above, the blending parameter is indicative of a degree to which control of the vehicle 100 is shared between an operator of the vehicle 100 and the ADAS 148. In an example, the blending parameter ranges from zero (full operator control of the vehicle 100) to one (full control of the vehicle 100 by the ADAS 148). The blending parameter may influence a trajectory of the vehicle 100 as the vehicle 100 moves about an environment.

At 920, the blending parameter notification system 170 determines a feedback parameter based upon the blending parameter and the psychophysical model 260. The psychophysical model 260 optimizes a relationship between the blending parameter and the feedback parameter such that sensory feedback that is based upon the feedback parameter is perceived to be proportional to the blending parameter. The sensory feedback may be haptic feedback, thermal feedback, and/or visual feedback. As such, the feedback parameter may be related to vibrations (e.g., an amplitude and/or frequency of vibration), temperature, or light (e.g., a brightness of light and/or a color of the light). According to embodiments in which the sensory feedback is visual feedback, the psychophysical model 260 may be or include a perceptually uniform color map.

At 930, the blending parameter notification system 170 causes a feedback modality (e.g., from the feedback modalities 460) of the steering apparatus 190 to provide the sensory feedback to the operator of the vehicle 100. The sensory feedback is based upon the feedback parameter. In an example, the lighting device 490 of the steering apparatus 190 emits light, where a color and/or brightness of the light is perceived as being proportional to the blending factor. For instance, when a value of the blending parameter is around 0.0 (e.g., 0.0 to 0.1), the lighting device 490 may emit red light (i.e., light having a wavelength of around 740 to 625 nm), where the red light corresponds to a first end of a visual spectrum of humans. When the value of the blending parameter is around 0.5 (e.g., 0.4 to 0.6), the lighting device 490 may emit green light (e.g., light having a wavelength of around 565 to 520 nm), where the green light corresponds to a middle of the visual spectrum. When the value of the blending parameter is around 1.0 (e.g., 0.9 to 1.0), the lighting device 490 may emit violet light (e.g., light ranging from 435 to 380 nm), where the violet light corresponds to a second end of the visual spectrum.

It is contemplated that the blending parameter notification system 170 operates continually and in real-time as the vehicle 100 navigates about an environment. For instance, subsequent to causing the feedback modality to provide the sensory feedback to the operator of the vehicle 100, the blending parameter notification system 170 obtains a second blending parameter from the ADAS 148. The second blending parameter is indicative of a second degree to which control of the vehicle 100 is shared between the operator of the vehicle 100 and the ADAS 148. In an example, the ADAS 148 generates the second blending parameter in response to changing conditions of the environment of the vehicle 100 as determined via the sensor system 120. The blending parameter notification system 170 determines a second feedback parameter based upon the second blending parameter and the psychophysical model 260. The psychophysical model 260 optimizes a second relationship between the second blending parameter and the second feedback parameter such that second sensory feedback that is based upon the second feedback parameter is perceived to be proportional to the second blending parameter. The blending parameter notification system 170 causes the feedback modality (e.g., from the feedback modalities 460) of the steering apparatus 190 to provide the second sensory feedback to the operator of the vehicle 100. The second sensory feedback is based upon the second feedback parameter.

Figure 10:
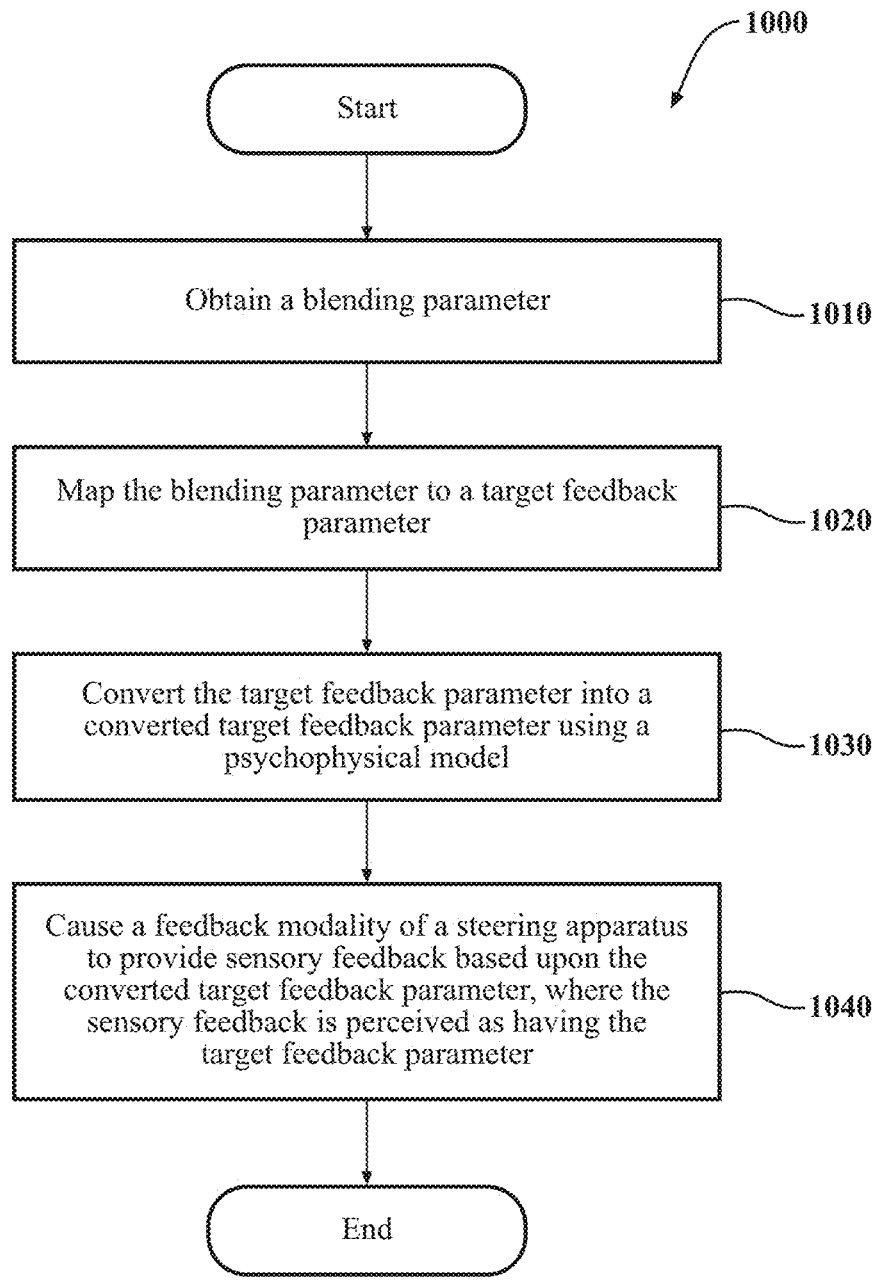
FIG. 10 illustrates one embodiment of a method that is associated with converting a blending parameter into sensory feedback that perceived by an operator of the vehicle as being proportional to the blending parameter.

FIG. 10 illustrates a flowchart of a method 1000 that is associated with converting a target feedback parameter into a converted target feedback parameter. The method 1000 will be discussed from the perspective of the blending parameter notification system 170 of FIGS. 1 and 2. While the method 1000 is discussed in combination with the blending parameter notification system 170, it should be appreciated that the method 1000 is not limited to being implemented within the blending parameter notification system 170 but is instead one example of a system that may implement the method 1000.

At 1010, the blending parameter notification system 170 obtains a blending parameter from the ADAS 148. As noted above, the blending parameter is indicative of a degree to which control of the vehicle 100 is shared between an operator of the vehicle 100 and the ADAS 148. In an example, a value of the blending parameter ranges from zero (full operator control of the vehicle 100) to one (full control of the vehicle 100 by the ADAS 148).

At 1020, the blending parameter notification system 170 maps the blending parameter to a target feedback parameter. In an example, the target feedback parameter is a frequency of vibration, an amplitude of vibration, a temperature, a wavelength of light, or a luminance of the light.

At 1030, the blending parameter notification system 170 converts the target feedback parameter into a converted target feedback parameter using the psychophysical model 260. The converted target feedback parameter is of the same type (e.g., frequency of vibration, temperature, etc.) as the target feedback parameter, but a value of the converted target feedback parameter may be different than a value of the target feedback parameter. In an example, the blending parameter notification system 170 provides the target feedback parameter as input to the psychophysical model 260 and the blending parameter notification system 170 obtains the converted target feedback parameter as output of the psychophysical model 260. In addition to the target feedback parameter, the psychophysical model 260 may output the converted target feedback parameter based upon characteristics of the operator of the vehicle 100 (e.g., sex, weight, skin temperature, force applied by the operator to the grip 410 of the steering apparatus 190, etc.), predetermined characteristics of human perception, and/or characteristics of the vehicle 100 (e.g., ambient temperature of a cabin of the vehicle 100, a temperature of the grip 410, a humidity level within the cabin of the vehicle 100, amplitudes and frequencies of vibrations of the vehicle 100 as the vehicle 100 travels about an environment, an ambient light level within the cabin of the vehicle 100, a material of the grip 410, etc.).

At 1040, the blending parameter notification system 170 causes a feedback modality of the steering apparatus 190 to provide sensory feedback to an operator of the vehicle 100, where the sensory feedback is based upon the converted target feedback parameter. Due to the non-linearity of human perception, the operator of the vehicle 100 perceives the sensory feedback as having the target feedback parameter even though the sensory feedback is provided based upon the converted target feedback parameter. In an example, the target feedback parameter is a first temperature and the converted target feedback parameter is a second temperature. The temperature changing device 480 causes the grip 410 of the steering apparatus 190 to be heated/cooled to the second temperature while the grip 410 is gripped by one or more hands of the operator. Although the grip 410 is heated/cooled to the second temperature, the operator of the vehicle 100 perceives the grip 410 as being heated/cooled to the first temperature.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle 100 is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. The steering system 143 may be a SbW steering system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle systems 140 include the ADAS 148. The ADAS 148 includes one or more of adaptive cruise control (ACC), an anti-lock braking system (ABS), an automotive night vision system, a backup camera, a blind spot monitor, a collision avoidance system, a crosswind stabilization system, cruise control, an electronic stability control (ESC) system, a forward collision warning (FCW) system, an intersection assistant system, an intelligent speed adaptation system, a lane centering system, a lane departure warning system (LDW), a lane change assistance system, parking sensors, a pedestrian protection system, rain sensors, tire pressure monitoring, a traction control system, a traffic sign recognition system, and/or a wrong-way driving warning.

The processor(s) 110, the blending parameter notification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the blending parameter notification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Although the blending parameter notification system 170 has been described above as obtaining the blending parameter from the ADAS 148, other possibilities are contemplated. According to embodiments, the blending parameter notification system 170 obtains the blending parameter from the autonomous driving module(s) 160.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for communicating a blending parameter of a vehicle via a feedback modality of a steering apparatus of the vehicle, the computing system comprising:
  a processor; and
  memory communicably coupled to the processor that stores instructions that, when executed by the processor, cause the processor to:
    obtain the blending parameter, wherein the blending parameter is indicative of a degree to which control of the vehicle is shared between an operator of the vehicle and an advanced driver-assistance system (ADAS) of the vehicle;
    determine a feedback parameter based upon the blending parameter and a psychophysical model, wherein the psychophysical model optimizes a relationship between the blending parameter and the feedback parameter such that sensory feedback that is based upon the feedback parameter is perceived to be proportional to the blending parameter; and
    cause the feedback modality to provide the sensory feedback to the operator of the vehicle based upon the feedback parameter.

2. The computing system of claim 1, wherein when a value of the blending parameter is zero, the operator is in full control of the vehicle, and further wherein when the value of the blending parameter is one, the ADAS is in full control of the vehicle.

3. The computing system of claim 1, wherein the feedback modality comprises a haptic feedback device, and further wherein the instructions that cause the feedback modality to provide the sensory feedback comprise further instructions that cause the haptic feedback device to generate vibrations.

4. The computing system of claim 3, wherein the vibrations are generated along a rotational axis of the steering apparatus or a translatory axis of the steering apparatus.

5. The computing system of claim 3, wherein the feedback parameter comprises at least one of:
  a frequency of the vibrations;
  an amplitude of the vibrations; or
  a waveform of the vibrations.

6. The computing system of claim 3, wherein the instructions further cause the processor to:
  obtain a measurement of force being applied to the steering apparatus by a hand of the operator as the hand grips the steering apparatus, wherein the feedback parameter is determined based upon the measurement of the force.

7. The computing system of claim 1, wherein the blending parameter is changed from a zero value to a non-zero value in response to the ADAS detecting a risk to the vehicle.

8. The computing system of claim 1, wherein a steering system of the vehicle is a steer-by-wire steering system.

9. A non-transitory computer-readable medium for communicating a blending parameter of a vehicle via a feedback modality of a steering apparatus of the vehicle and including instructions that, when executed by a processor, cause the processor to:
obtain the blending parameter, wherein the blending parameter is indicative of a degree to which control of the vehicle is shared between an operator of the vehicle and an advanced driver-assistance system (ADAS) of the vehicle;
determine a feedback parameter based upon the blending parameter and a psychophysical model, wherein the psychophysical model optimizes a relationship between the blending parameter and the feedback parameter such that sensory feedback that is based upon the feedback parameter is perceived to be proportional to the blending parameter; and
cause the feedback modality to provide the sensory feedback to the operator of the vehicle based upon the feedback parameter.

10. The non-transitory computer-readable medium of claim 9, wherein the feedback modality comprises a temperature changing device comprised by a grip of the steering apparatus, and further wherein the instructions that cause the feedback modality to provide the sensory feedback comprise further instructions that cause the temperature changing device to heat or cool the grip.

11. The non-transitory computer-readable medium of claim 10, wherein the instructions for determine the feedback parameter based upon the blending parameter and the psychophysical model comprise further instructions to:
map the blending parameter to a target temperature; and
convert the target temperature to a converted target temperature that is different than the target temperature, wherein when the temperature changing device heats or cools the grip to the converted target temperature, the operator perceives the grip as being at the target temperature.

12. The non-transitory computer-readable medium of claim 11, wherein convert the target temperature to the converted target temperature is based upon at least one of:
a material of the grip of the steering apparatus;
an ambient temperature of a cabin of the vehicle;
a temperature of the grip of the steering apparatus;
a skin temperature of a hand of the operator of the vehicle; or
a humidity level of the cabin of the vehicle.

13. The non-transitory computer-readable medium of claim 9, wherein the blending parameter is increased from a zero value to a non-zero value in response to the ADAS determining that a current angle of the steering apparatus is insufficient to avoid an obstacle in an environment of the vehicle.

14. A method comprising:
obtaining a blending parameter that is indicative of a degree to which control of a vehicle is shared between an operator of the vehicle and an advanced driver-assistance system (ADAS) of the vehicle;
determining a feedback parameter based upon the blending parameter and a psychophysical model, wherein the psychophysical model optimizes a relationship between the blending parameter and the feedback parameter such that sensory feedback based upon the feedback parameter is perceived to be proportional to the blending parameter; and
causing a feedback modality of a steering apparatus of the vehicle to provide the sensory feedback based upon the feedback parameter.

15. The method of claim 14, wherein the feedback modality comprises a lighting device comprised by a grip of the steering apparatus, and further wherein causing the feedback modality to provide the sensory feedback comprises causing the lighting device to emit light.

16. The method of claim 15, wherein the feedback parameter comprises at least one of:
a wavelength of the light;
a luminance of the light; or
a number of lights illuminated.

17. The method of claim 15, wherein the light comprises first light when a value of the blending parameter is zero and second light when the value of the blending parameter is one, and further wherein the first light corresponds to a first end of a visual spectrum and the second light corresponds to a second end of the visual spectrum.

18. The method of claim 15, further comprising:
obtain a measurement of an ambient light level within a cabin of the vehicle, wherein the feedback parameter is determined based upon the ambient light level.

19. The method of claim 14, further comprising:
subsequent to causing the feedback modality to provide the sensory feedback to the operator of the vehicle via the steering apparatus of the vehicle based upon the feedback parameter, obtaining a second blending parameter, wherein the second blending parameter is indicative of a second degree to which control of the vehicle is shared between the operator of the vehicle and the ADAS;
determining a second feedback parameter based upon the second blending parameter and the psychophysical model, wherein the psychophysical model optimizes a second relationship between the second blending parameter and the second feedback parameter such that second sensory feedback based upon the second feedback parameter is perceived to be proportional to the second blending parameter; and
causing the feedback modality to provide the second sensory feedback via the steering apparatus of the vehicle based upon the second feedback parameter.

20. The method of claim 14, wherein a trajectory of the vehicle is influenced by the blending parameter.

* * * * *